US009803335B1

(12) United States Patent
Myers et al.

(10) Patent No.: US 9,803,335 B1
(45) Date of Patent: Oct. 31, 2017

(54) INTEGRATED CB MICROPHONE CONTROL

(71) Applicant: DEERE & COMPANY, Moline, IL (US)

(72) Inventors: David J. Myers, Asbury, IA (US); Thomas A. Porter, Dubuque, IA (US)

(73) Assignee: DEERE & Company, Moline, IL (US)

( * ) Notice: Subject to any disclaimer, the term of this patent is extended or adjusted under 35 U.S.C. 154(b) by 0 days.

(21) Appl. No.: 15/156,606

(22) Filed: May 17, 2016

(51) Int. Cl.
| | |
|---|---|
| *H04B 1/38* | (2015.01) |
| *E02F 9/20* | (2006.01) |
| *E02F 3/43* | (2006.01) |
| *H04B 1/44* | (2006.01) |
| *E02F 3/34* | (2006.01) |

(52) U.S. Cl.
CPC ............ *E02F 9/2004* (2013.01); *E02F 3/431* (2013.01); *E02F 9/2087* (2013.01); *H04B 1/44* (2013.01); *E02F 3/34* (2013.01)

(58) Field of Classification Search
CPC . B60R 11/0205; B60R 11/02; B60R 11/0211; B60R 2011/001; B60R 2011/0028; B60R 11/0241; B60R 11/0264; B60R 2011/0005; B60R 2011/0007; B60R 2011/0045; B60R 2011/0063; B60R 2011/0085; B60R 11/00; B60R 11/0247; B60K 37/06; B60K 2350/941; B60K 37/04; B60K 2026/029; B60K 2350/1004; B60K 2350/925; B60K 2350/928; B60K 2350/945; B60K 2350/948; B60K 26/02; B60K 35/00; B60K 37/00; H04M 1/6075; H04M 1/6083; H04M 1/66; H04M 1/72569; H04M 2250/12
See application file for complete search history.

(56) References Cited

U.S. PATENT DOCUMENTS

| | | | |
|---|---|---|---|
| 8,074,342 B1 * | 12/2011 | Jordan ................. | H05K 5/0247 29/592.1 |
| 9,108,689 B1 * | 8/2015 | Shelby ............... | B62D 33/0617 |
| 2005/0211449 A1 | 9/2005 | Bares et al. | |
| 2007/0162550 A1 * | 7/2007 | Rosenberg ............ | H04L 12/581 709/206 |
| 2009/0309779 A1 * | 12/2009 | Buckbee ................. | E01C 19/20 341/176 |
| 2013/0264138 A1 | 10/2013 | Phillips | |
| 2016/0304181 A1 * | 10/2016 | Steven ................... | B63H 25/02 |

FOREIGN PATENT DOCUMENTS

| | | |
|---|---|---|
| EP | 1640512 A2 | 3/2006 |
| WO | WO2015190631 A1 | 12/2015 |

* cited by examiner

*Primary Examiner* — Golam Sorowar
(74) *Attorney, Agent, or Firm* — Taft Stettinius & Hollister LLP; Stephen F. Rost (57) ABSTRACT

A control system of a work machine including an operator's cab and an implement, the system comprising a vehicle control unit for controlling the machine; a first control device located in the cab for controlling a steering function of the machine; a second control device located in the cab for controlling the implement; a CB transceiver located in the cab, the CB transceiver configured to receive and transmit signals; and a CB microphone control disposed on the first control device or the second control device, the CB microphone control being operably actuable between an active position and an inactive position, where in the active position the transceiver is enabled to transmit a signal, and in the inactive position the transceiver is enabled to receive a signal.

20 Claims, 7 Drawing Sheets

INTEGRATED CB MICROPHONE CONTROL

FIELD OF THE DISCLOSURE

The present disclosure relates to a Citizens Band ("CB") radio control, and in particular, to CB radio control that allows the user to control the microphone at the controls of a work machine.

BACKGROUND OF THE DISCLOSURE

Many different types of work machines or other vehicles utilize radio transmissions or other wireless means to allow a user to communicate with a third party located remotely from the user. One common form of wireless communication is a CB radio. A CB radio has a transceiver that transmits and receives wireless signals through an antenna. A CB radio frequently has a microphone that allows the user to selectively transmit audio signals through the CB. Many CB radios have a microphone with a push button positioned on the microphone to allow the user to both hold the microphone at a location that will observe the user's voice and allow the user to selectively engage the push button to transmit the audio signal through the transceiver.

The transceiver frequently has a speaker that plays any audio signals received by the transceiver through the antenna when the transceiver is powered on and the push button is not engaged. Accordingly, the CB radio often requires some use of at least one of the user's hands. In many work machines, using the CB radio causes the user to at least partially release part of the controls of the work machine.

SUMMARY

One embodiment of the present disclosure is a control system of a work machine including an operator's cab and an implement, the system comprising a vehicle control unit for controlling the machine; a first control device located in the cab for controlling a steering function of the machine; a second control device located in the cab for controlling the implement; a CB transceiver located in the cab, the CB transceiver configured to receive and transmit signals; and a CB microphone control disposed on the first control device or the second control device, the CB microphone control being operably actuable between an active position and an inactive position, where in the active position the transceiver is enabled to transmit a signal, and in the inactive position the transceiver is enabled to receive a signal.

In one example, the vehicle control unit is electrically coupled between the CB microphone control and the transceiver. In this example, when the vehicle control unit detects the CB microphone control is in the active position, the vehicle control unit operably activates an output driver coupled to the transceiver to enable transmit functionality.

In another example the vehicle control unit is in electrical communication with the transceiver via a controller area network (CAN) link.

In another example, the CB microphone control is only electrically coupled to the transceiver.

In yet another example, an integrated connector electrically couples the CB microphone control directly to the transceiver.

In another example, a relay is disposed in electrical communication between the vehicle control unit and the transceiver.

Another embodiment is a work machine having a chassis; a plurality of ground-engaging mechanisms coupled to the chassis for propelling the machine along a direction of travel; a cab mounted to the chassis; an implement coupled to the chassis and being operably controllable to perform a work function; a plurality of operator controls located in the cab for controlling the machine, the plurality of operator controls including at least a first control device for controlling a steering function of the machine and a second control device for controlling the implement; and a CB communication system located in the cab, the CB communication system including at least a transceiver and a CB microphone control, the transceiver adapted to receive and transmit signals; wherein, the CB microphone control is located on either the first control device or the second control device; further wherein, the CB microphone control is controllable between an active position and an inactive position, where in the active position the transceiver is enabled to transmit a signal, and in the inactive position the transceiver is enabled to receive a signal.

In one example, the first control device and the second control device comprise joysticks; and the CB microphone control is a push button that is disposed in the active position when the push button is depressed.

In another example, a speaker system is disposed in the cab for audibly transmitting a communication received by the transceiver. In this example, a radio system transmits a signal via the speaker system, wherein the radio system is disabled from transmitting when the CB microphone control is in the active position.

In another aspect of this example, the radio system is disabled from transmitting when the CB microphone control is in the inactive position and the transceiver receives the communication.

In another example, an integrated connector electrically couples the CB microphone control directly to the transceiver.

In yet another example, a vehicle control unit is electrically coupled between the CB microphone control and the transceiver. Further, when the vehicle control unit detects the CB microphone control is in the active position, the vehicle control unit operably activates an output driver coupled to the transceiver to enable transmit functionality. In one aspect of this example, the vehicle control unit is in electrical communication with the transceiver via a controller area network (CAN) link.

Another embodiment of the present invention is a method of transmitting a signal via a CB communication system from a work machine by providing a work machine having an operator's cab, a first control device and a second control device located in the cab, and a vehicle control unit for controlling the machine; providing the CB communication system located in the cab, the CB communication system including at least a transceiver and a CB microphone control disposed on either the first control device or the second control device, the CB microphone control having an active position and an inactive position; steering the machine via input from the first control device; controlling the implement to perform a work function via input from the second control device; detecting an actuation of the CB microphone control to its inactive position by the vehicle control unit; and transmitting a signal from the transceiver when the CB microphone control is disposed in its active position.

In one example, the method includes activating the CB microphone control on either the first control device or the second control device by an operator without any interruption of controlling the first and second control devices.

In another example, the method includes providing a radio system and a speaker system in the cab; transmitting a signal from the radio system via the speaker system; and disabling the radio system when the CB microphone control is in the active position. Another aspect of this example includes receiving a communication by the transceiver; disabling the radio system when the transceiver receives the communication; and audibly communicating the communication received by the transceiver via the speaker system.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 2b is a different isolated elevated perspective view of the operator's cab of FIG. 2a;

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
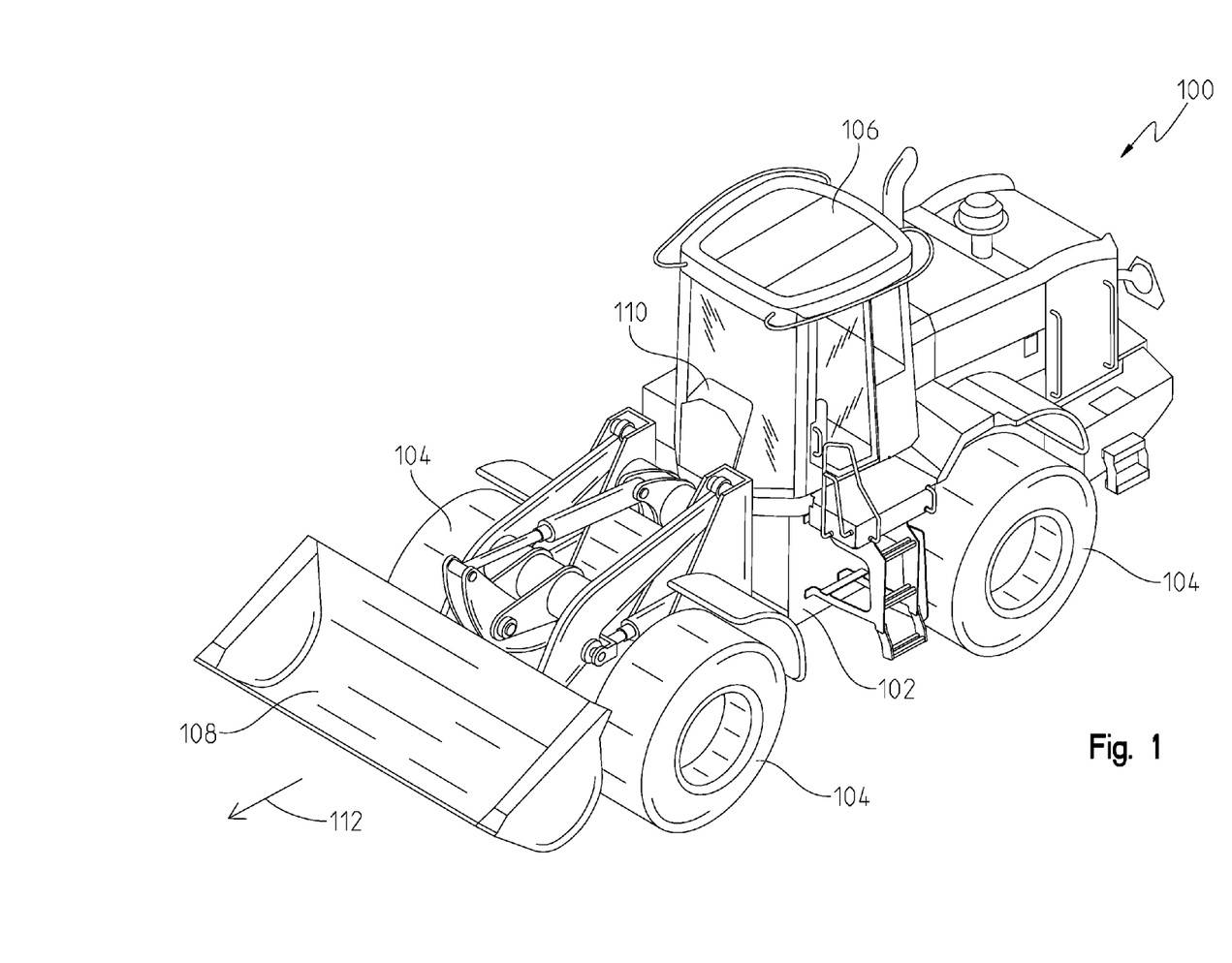
FIG. 1 is an elevated perspective view of a work machine.

Referring to FIG. 1, one embodiment of a work machine 100 is shown. The work machine 100 may have a chassis 102 coupled to one or more ground engaging mechanisms 104 such as wheels, tracks, or the like. An operator's cab 106 may also be coupled to the chassis 102 and provide a location for an operator to control the components of the work machine 100. In on example, an implement 108 may be coupled to the chassis 102. The implement 108 may be a bucket, forks, a mower, a backhoe, a farm implement, a construction implement, etc. and this disclosure is not limited to any particular type of implement.

While a substantially enclosed operator's cab 106 is shown and described herein, this disclosure is not limited to work machines 100 with a fully enclosed operator's cab 106. More specifically, the operator's cab 106 may be referring to a location where the user can control the work machine 100. In one embodiment, the operator's cab 106 may only be a canopy. In yet another embodiment, the operator's cab 106 may not have a canopy but be substantially open.

The operator cab 106 may also have operator controls 110 positioned therein. The operator controls 110 may allow the user to selectively control the implement 108. Further, the operator controls 110 may allow the user to selectively engage the ground engaging mechanisms 104 in a direction of travel 112. Further still, the operator controls 110 may also allow the user to selectively alter the direction of travel 112. The direction of travel 112 is only one illustrative example of a direction that the operator controls 110 may allow the work machine 100 to travel. A person skilled in the relevant art understands that many work machines 100 have controls 110 that can be manipulated by the user to alter the direction of travel 112 to substantially any direction along the underlying surface. Accordingly, this disclosure is not limited to the particular direction of travel 112 shown and described herein.

The operator controls 110 may be any type of operator control known in the art. In one embodiment, the operator controls 110 may be a steering wheel and a plurality of foot pedals. In another embodiment, the operator controls may be one or more joysticks with a plurality of buttons. In yet another embodiment, the operator controls 110 may be handlebars with grips, levers, and buttons that can be manipulated to control the work machine 100. Further still, the operator controls 110 may be any combination of the above-described embodiments and this disclosure is not limited to any particular type of operator controls 110.

Figure 2A:
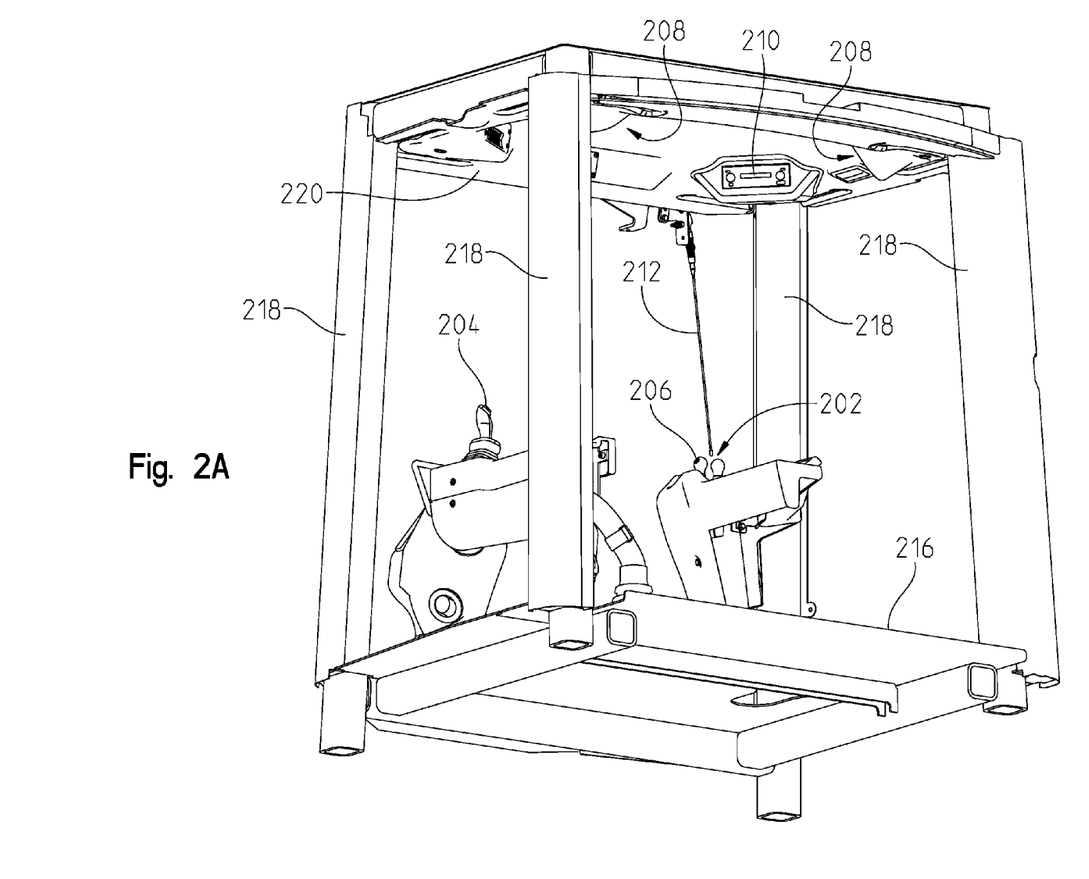
FIG. 2a is an isolated elevated perspective view of one embodiment of an operator's cab of the work machine from FIG. 1.
Figure 2B:
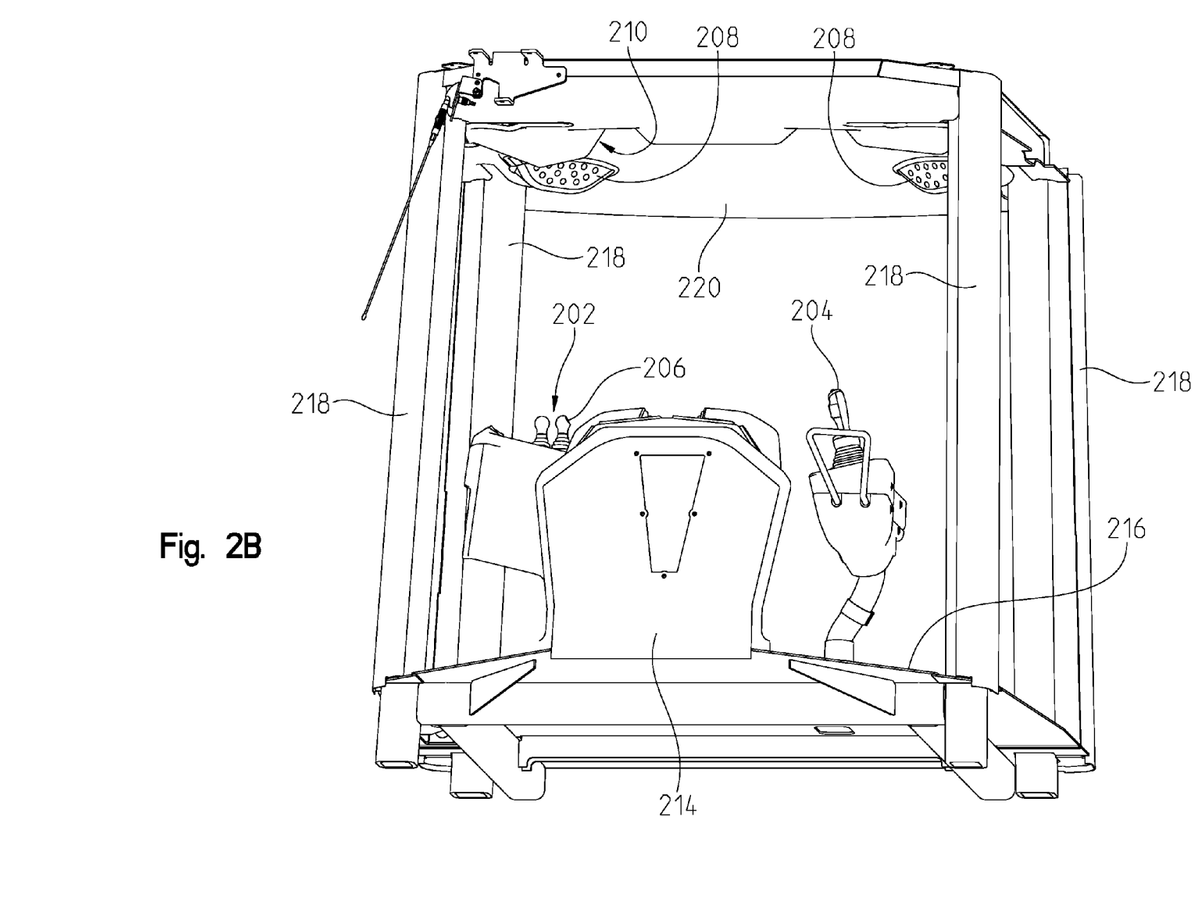

Now referring to FIG. 2, an interior view of one embodiment of the operator's cab 106 is shown. In the embodiment shown in FIG. 2, the operator controls 110 may include a first control device 202 and a second control device 204. The first control device 202 may be a joystick having a plurality of buttons and configured to control the direction of travel 112 of the work machine 100. More specifically, the first control device 202 may control both the speed and direction of the work machine 100 relative to an underlying surface.

The second control device 204 may also be a joystick that has a plurality of buttons and is configured to control the implement 108 of the work machine 100. More specifically, the second control device 204 may selectively control a hydraulic system (not shown) to alter the position of the implement 108 based on the position of the second control device 204.

In one non-limiting example of the present disclosure, to properly control the work machine 100, the user may interact with both the first and second control devices 202, 204 simultaneously. More specifically, many work machines 100 require the user to control both the direction of travel 112 and the location of the implement 108. Accordingly, the user may need to manipulate both the first and second control devices 202, 204 to control the work machine 100.

While the first and second control devices 202, 204 have been described as controlling specific components of the work machine 100, this disclosure is not limited to implementing the first and second control devices 202, 204 as described above. More specifically, in another embodiment the first control device 202 may control the implement while the second control device 204 may control ground engaging mechanisms 104 and the direction of travel 112. Further still, the first and second control devices 202, 204 may each control a different part of the implement 108 or the direction of travel 112. Accordingly, this disclosure considers control devices that control the direction of travel and implement of a work machine in any way known in the art.

The operator's cab 106 may also house a transceiver 210 along an upper portion 220 of the operator's cab 106. While the transceiver 210 is shown mounted to the upper portion 220 of the operator's cab 106 in FIG. 2a, the transceiver 210 can be mounted at many different locations on the work machine 100. In another embodiment, the transceiver 210 is mounted to a center console 214 of the operator's cab 106. In another embodiment, the transceiver 210 is mounted at a floor 216 of the operator's cab 106. In yet another embodiment, the transceiver 210 is mounted to the work machine 100 at a location outside of the operator's cab 106. A person skilled in the art understands the many locations on the work machine 100 that the transceiver 210 can be mounted and this disclosure is not limited to any one location.

Also shown in FIG. 2a is one or more speaker 208. The one or more speaker 208 may be coupled to the transceiver 210, a radio, or both, to transmit signals sent to the speaker 208 to audible noises projected into the operator's cab 106. In the embodiment shown in FIG. 2a, the speakers 208 are mounted to the operator's cab 106 at a top portion. However, speakers 208 can be mounted to many different locations within the operator's cab 106. More specifically, one or more speaker 208 may be mounted in a headrest of the seat, along the floor 216 of the operator's cab 106, along the center console 214 of the operator's cab 106, and along one or more pillar 218 that couple the top portion 220 of the operator's cab 106 to the floor 216. In another embodiment, a speaker 208 may be located at each of these locations. In yet another embodiment, only one speaker 208 is located at any one of the above-described locations. In another embodiment, the speaker 208 is positioned outside of the operator's cab 106 to project an audible sound to the area outside of the operator's cab.

The operator's cab 106 may also provide a location to couple an antenna 212 thereto. The antenna may be further communicate with to the transceiver 210, the radio, or both, to send wireless signals captured by the antenna 212 to the transceiver 210, radio, or both. The antenna 212 may be coupled to a bracket on an outside portion of the operator's cab 106. In one embodiment, the antenna 212 may pivot between a lowered position where the antenna 212 has a distal portion pointing towards an underlying surface of the work machine 100 and a raised position where the distal portion of the antenna 212 points away from the underlying surface. In another embodiment, the antenna 212 may be fixedly coupled to the work machine 100 in the lowered position, the raised position, or any position therebetween.

In yet another embodiment, the antenna 212 may be positioned within the operator's cab 106. When the antenna 212 is positioned within the operator's cab 106, the antenna 212 may be located in the upper portion 220, the floor 216, or in one of the pillars 218 coupling the upper portion 220 of the operator's cab 106 to the floor 216. In yet another embodiment, more than one antenna 212 may be positioned in any of the locations described above.

A microphone (not shown) may also be mounted in the operator's cab 106 at any of the surfaces described above. More specifically, the microphone may be mounted in the upper portion 220, one of the pillars 218, the floor 216, the center console 214, or any of the first or second control devices 202, 204. Further, more than one microphone may be mounted to any combination of the locations described above. Further still, in one embodiment a microphone may be positionable on a user to transmit audio signals generated by the user to the transceiver 210. The microphone can be positioned in any location that allows the microphone to identify audible signals and communicate those signals to the transceiver 210.

Figure 3:
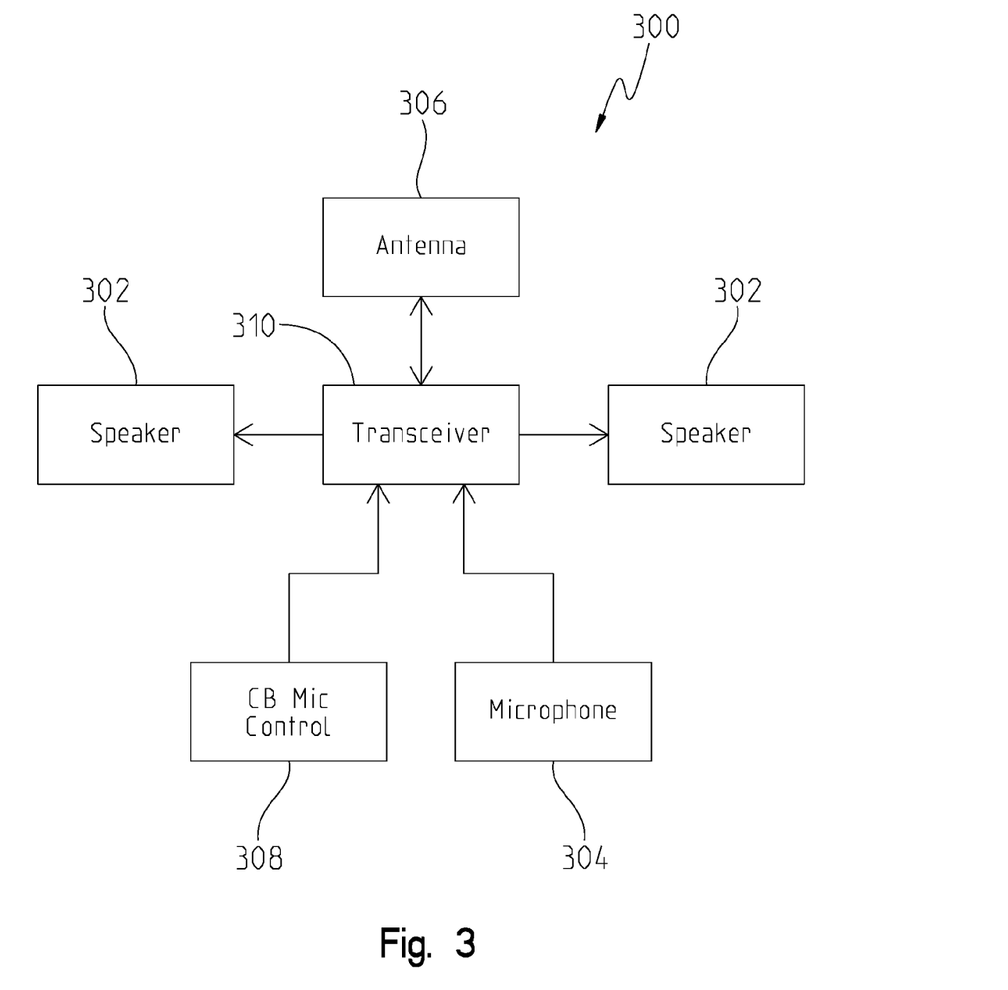
FIG. 3 is a block diagram of a CB communication system.

Referring to FIG. 3, a CB communication system 300 may also be part of the operator's cab 106. In illustrative block-diagram of FIG. 3, the CB communication system 300 may have one or more speaker 302, a mic or microphone 304, an antenna 306, a CB mic control 308, and a transceiver 310. In one embodiment, several of the illustrative components of the CB communication system 300 from FIG. 3 may be shown in FIG. 2. For example, the illustrative transceiver 310 may be the transceiver 210, the illustrative speaker 302 may be the speakers 208, and the illustrative antenna 306 may be the antenna 212. While specific locations for the transceiver 210, speakers 208, and antenna 212 are shown in FIG. 2, this disclosure is not limited to any particular location of these components. Accordingly, The CB communication system 300 is illustrative and considers many different physical locations for the components described therein.

The transceiver 310 may be a CB transceiver that can both selectively receive, and selectively transmit a signal wirelessly. The antenna 306 may be positioned at any location on the work machine 100. In one non-exclusive example the antenna 306 may be positioned along a top portion of the operator's cab 106.

The speaker 302 of the CB communication system 300 may be part of the transceiver 310, part of a work machine sound system, or both. In the embodiment where the speaker 302 is part of the transceiver 310, any signals received by the transceiver 310 may be amplified to audible levels by the speaker 302 of the transceiver 310 for the user to hear.

Further, the work machine sound system may be integrated into the operator's cab 106 of the work machine 100. The work machine sound system may have speakers 302 positioned throughout the operator's cab 106 and a radio or other receiver that sends a signal to the speakers 302 to create an audible sound. The radio may receive audio signals from wireless channels such as FM, AM, XM, etc. and convert and amplify the audio signals to an audible sound projected through the speakers 302. In this embodiment, when the transceiver 310 receives a signal the transceiver 310 may send the signal to the radio to be projected through the speakers 302 coupled thereto. Further, the radio may assign the signal received from the transceiver 310 priority over the audio signals being sent to the speakers 302 from the radio. In this embodiment, if the user is listening to audio signals from the radio, such as an FM radio station, the radio may substantially mute or reduce the volume of the FM station when the radio receives a signal from the transceiver 310. Accordingly, the volume of the FM station is reduced or muted while the signal from the transceiver 310 is audibly transmitted out of the speakers 302.

The microphone 304 may also be positioned at several different locations throughout the operator's cab 106. In one embodiment, the microphone 304 may be positioned in a headliner along a top portion of the operator's cab 106. In another embodiment, the microphone 304 may be positioned along an A-post of the operator's cab 106. A person having skill in the art understands the many places the microphone 304 can be positioned within an operator's cab and this disclosure is not limited to any one particular location.

The microphone 304 may be selectively coupled to the transceiver 310 to transmit audio signals therefrom. More specifically, a CB mic control 308 may be positioned on the first or second control device 202, 204. Further, the CB mic control 308 may be selectively positionable between an active position and an inactive position. In the active position, the CB mic control 308 may send audio signals identified by the microphone 304 to the transceiver 310 to be transmitted to a third party. However, when the CB mic control 308 is in the inactive position, the transceiver 310 may not send audio signals to the third party. Further, the transceiver 310 may not play audio signals received by the antenna 306 when the CB mic control 308 is in the active position and the transceiver 310 may play audio signals received by the antenna 306 when the CB mic control 308 is in the inactive position.

In one aspect of the present disclosure the CB mic control 308 may be a switch that is springedly or otherwise biased in the inactive position. If the user does not exert a force on the CB mic control 308 sufficient enough to overcome the biasing force, the CB mic control 308 will remain in the inactive position. Alternatively, the user may apply a force to the CB mic control 308 sufficient to overcome the biasing force and position the CB mic control 308 in the active position. The CB mic control 308 may only remain in the biased position as long as the user applies the appropriate force.

In the above embodiment, the CB mic control 308 may be positioned along the first or second control device 202, 204 at a location that allows the user to transition the CB mic control 308 between the active and inactive position without substantially relinquishing control of the respective first or second control device 202, 204. In other words, the user can maintain control of both the implement 108 and the direction of travel 112 of the work machine 100 while simultaneously transitioning the CB mic control 306 between the active and inactive positions.

Figure 4:
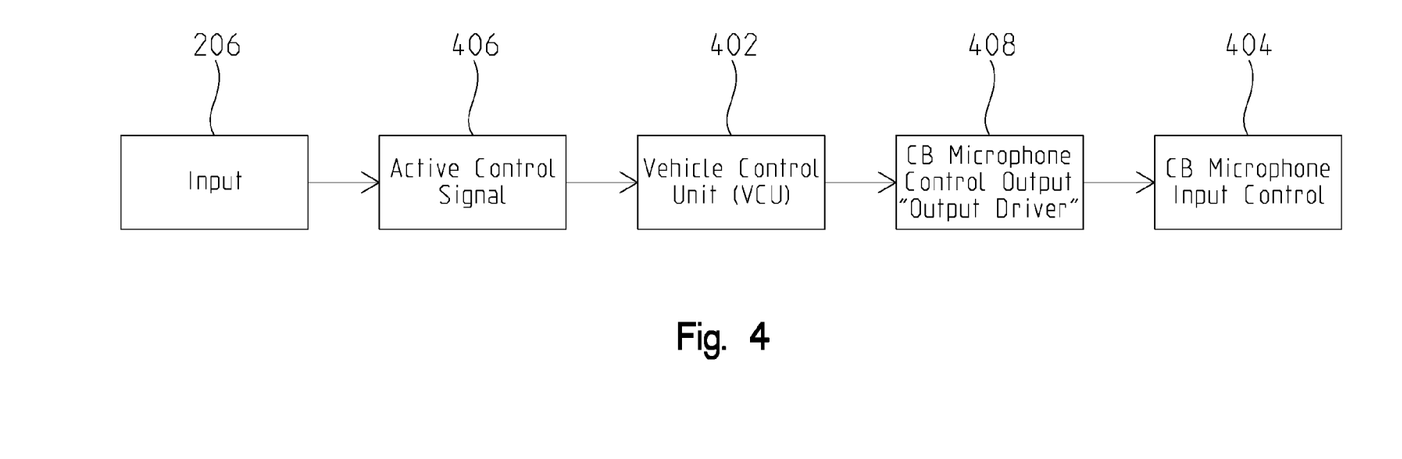
FIG. 4 is an illustrative system diagram of one embodiment of the present disclosure.

Now referring to FIG. 4, one embodiment of the present disclosure is shown in an illustrative system diagram. In the embodiment of FIG. 4, the CB mic control 308 may selectively transmit an active or inactive signal to a vehicle control unit ("VCU") 402. The VCU 402 may be any type of controller that controls low-level functions and to provide vehicle supervisory control. The VCU 402 may perform traditional vehicle safety and control functions, and may be responsible for coordinating low-level vehicle control tasks among other things.

In the embodiment of FIG. 4, the VCU 402 may be in communication with both the CB mic control 308 and a CB mic input 404 of the transceiver 310. In this embodiment, when the user manipulates the CB mic control 308 to the active position, a corresponding active control signal 406 may be sent to the VCU 402. The VCU may interpret the active control signal 406 as an indication that the VCU should send an output driver signal 408 to the CB mic input 404 of the transceiver 310. When the transceiver 310 identifies the output driver signal 408 through the CB mic input 404, the transceiver 310 may begin transmitting signals generated by the microphone 304. In other words, the CB mic control 308 may utilize the VCU 402 to indicate to the transceiver 310 when the user wants to transmit an audio signal.

Figure 5:
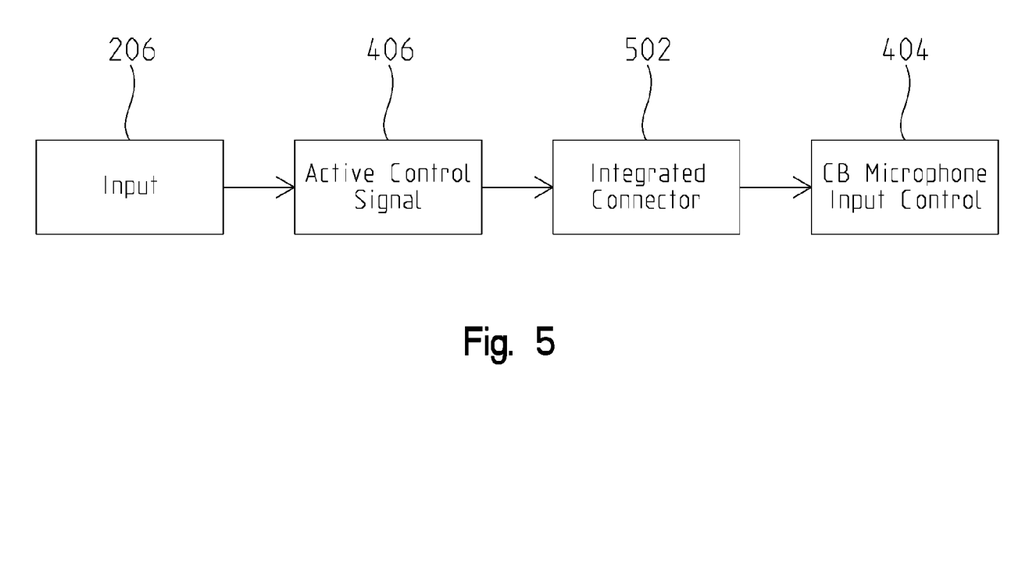
FIG. 5 is an illustrative system diagram of another embodiment of the present disclosure.

Referring now to FIG. 5, another embodiment of the present disclosure is shown in an illustrative system diagram implementing an integrated connector 502. In this embodiment, when the CB mic control 308 is in the active position, the active control signal 406 may be sent to the integrated connector 502. The integrated connector 502 may further be coupled to the CB mic input 404. In this embodiment, the CB mic control 308 may be in direct communication with the CB mic input 404 through the integrated connector 502 instead of the VCU 402 of the embodiment in FIG. 4. Accordingly, the embodiment of FIG. 4 may not substantially modify the signal generated by the CB mic control 308 when it is in the active position. Rather, the integrated connector 502 corresponds with the CB mic input 404 to send the signal directly to the transceiver 310 when the CB mic control 308 is in the active position. In this embodiment, the signal generated by the CB mic control 308 in the active position is sufficient to indicate to the transceiver 310 to transmit audio from the microphone 304. In other words, the signal generated by the CB mic control 308 in the active position is not substantially modified as it is communicated to the transceiver 310.

Figure 6:
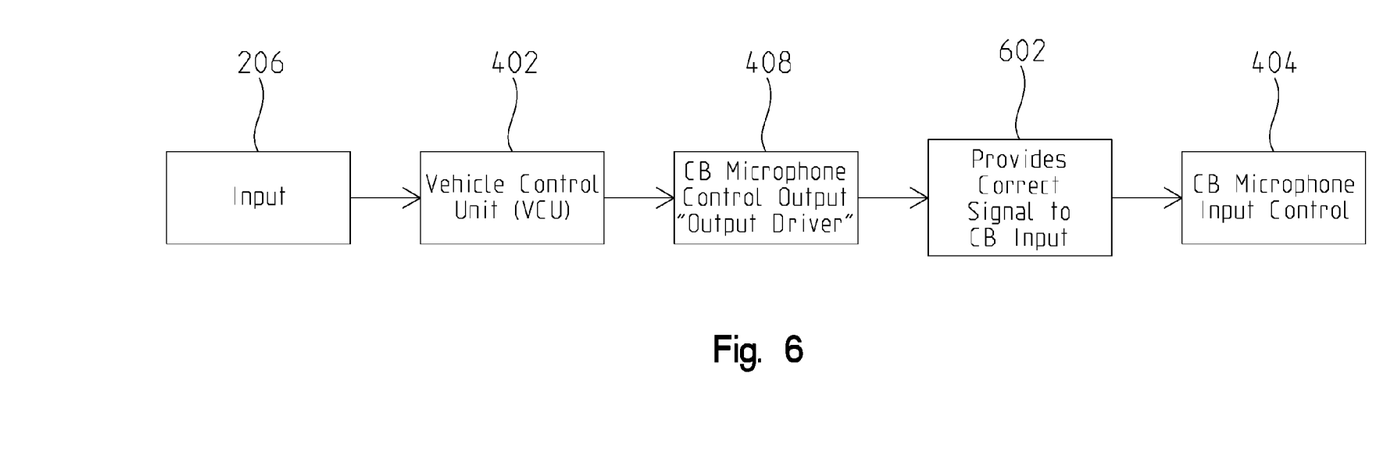
FIG. 6 is an illustrative system diagram of another embodiment of the present disclosure.

Referring now to FIG. 6, a different embodiment of an illustrative system diagram implementing a relay 602 is shown. The embodiment of FIG. 6 may have the relay 602 between the VCU 402 and the CB mic input 404. In this embodiment, the output driver signal 408 sent from the VCU 402 may control the orientation of the relay 602 between an open and closed position. In turn, the relay 602 may selectively provide a signal to the CB mic input 404 based on the position of the relay 602. In this embodiment, the relay 602 may provide a proper signal to the the CB mic input 404 when the relay 602 is in the closed position or vice versa. This embodiment also may allow the position of the CB mic control 308 to be effectively communicated to the CB mic input 404 when the VCU 402 is not capable of providing the proper signal directly thereto. More specifically, if the VCU 402 cannot provide a signal at a proper voltage to the CB mic input 404, the relay 602 may be opened or closed by the VCU 402 to communicate the proper signal to the CB mic input 404.

Figure 7:
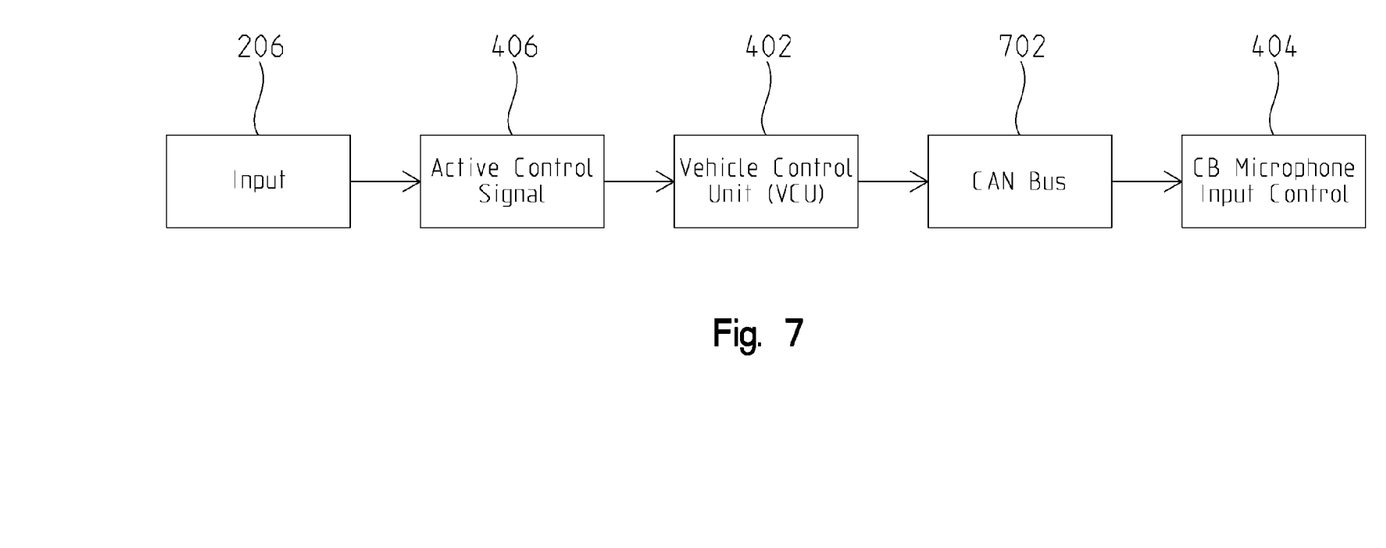
FIG. 7 is an illustrative system diagram of another embodiment of the present disclosure.

Referring now to FIG. 7, another embodiment of the present disclosure is shown. In the embodiment of FIG. 7, the VCU 402 may be in communication with both the CB mic control 308 and a CB mic input 404 of the transceiver 310. Further, when the user manipulates the CB mic control 308 to the active position, a corresponding active control signal 406 may be sent to the VCU 402. The VCU 402 may interpret the active control signal 406 as an indication that the VCU 402 should send a CAN bus signal 702 to the CB mic input 404 of the transceiver 310. When the transceiver 310 identifies the CAN bus signal 702 through the CB mic input 404, the transceiver 310 may begin transmitting signals generated by the microphone 304. In other words, the CB mic control 308 may utilize the VCU 402 to indicate to the transceiver 310 through the CAN bus signal 702 when the user wants to transmit an audio signal. In this embodiment, the CB mic input control 306 may be engaged through a signal Controller Area Network bus ("CAN bus") signal. Further, the VCU 402 may output the CAN bus signal 702 in a CAN bus format that is identified by the CB mic input control 306 as an indication for the transceiver 310 to transmit the corresponding signal.

Figure 8:
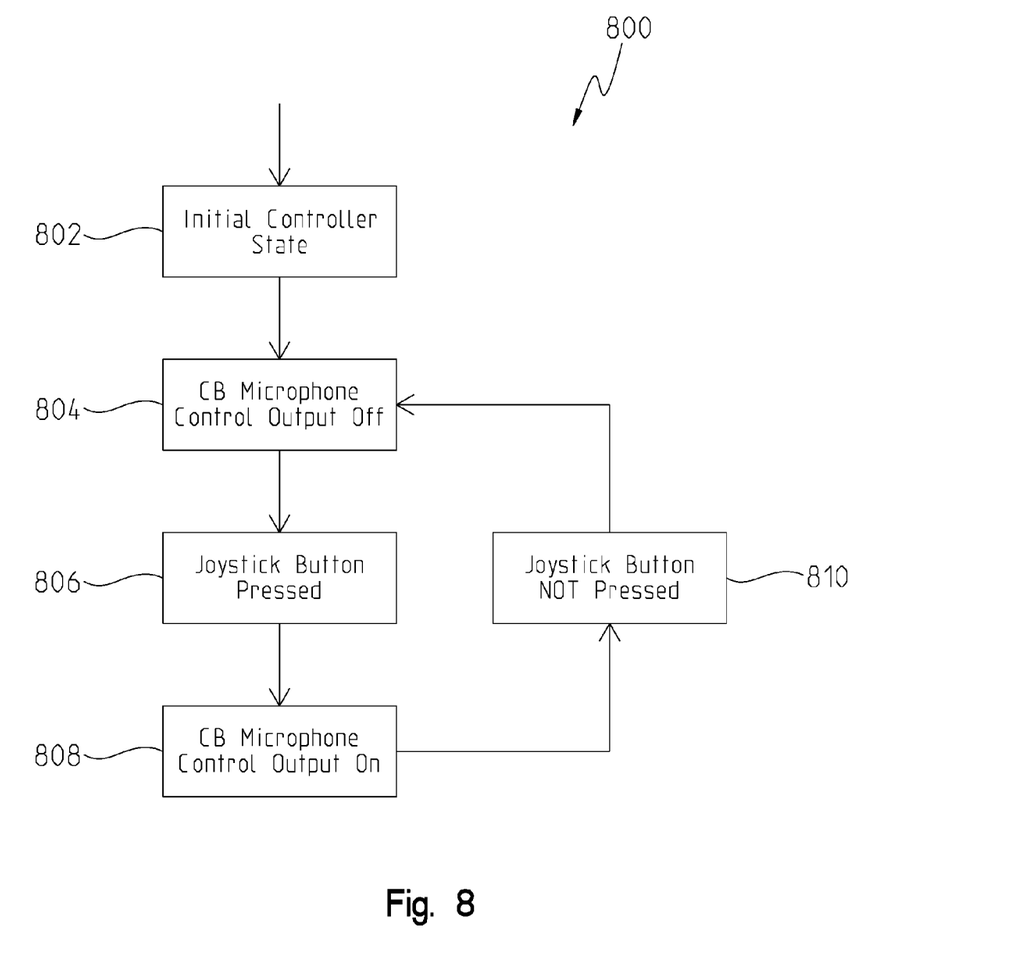
FIG. 8 is an illustrative flowchart of one embodiment of microphone control logic.

Referring to FIG. 8, a button position flowchart 800 is shown. The button position flowchart 800 shows an initial controller state 802 that result in a microphone control output being off in block 804. When the microphone control output is off in block 804, the transceiver 310 may not transmit audio signals generated by the microphone or components thereof. However, a joystick button (or CB mic control 308) may be pressed by the user 806 as described in more detail above. While the joystick button is pressed 806, the CB microphone control output may be on in block 808. Once the joystick button is no longer pressed 810, the button position flowchart 800 change the microphone control output back off in block 804.

The flowchart 800 may continually monitor the joystick button, CB mic control 308, or other similar switching mechanism to determine when the transceiver 310 should transition between transmitting signals generated by the microphone and receiving wireless signals from a third party. Accordingly, the particular order and sequence of steps described above is not limiting.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A control system of a work machine including a chassis and an operator's cab and an implement, the system comprising:
   a vehicle control unit for controlling the machine;
   a first control device located in the cab for controlling a steering function of the machine, wherein the first control device includes a joystick being manipulable between different positions;
   a second control device located in the cab for controlling a position of the implement with respect to the chassis, wherein the second control device is manipulable between different positions;
   a citizen's band (CB) transceiver located in the cab, the CB transceiver configured to receive and transmit audio signals; and
   a CB microphone control disposed on the first control device or the second control device, wherein the CB microphone control moves with manipulation of the first or second control device, the CB microphone control being operably actuable between an active position and an inactive position, where in the active position the transceiver is enabled to transmit an audio signal, and in the inactive position the transceiver is enabled to receive an audio signal.

2. The system of claim 1, wherein the vehicle control unit is electrically coupled between the CB microphone control and the transceiver.

3. The system of claim 2, wherein when the vehicle control unit detects the CB microphone control is in the active position, the vehicle control unit operably activates an output driver coupled to the transceiver to enable transmit functionality.

4. The system of claim 2, wherein the vehicle control unit is in electrical communication with the transceiver via a controller area network (CAN) link.

5. The system of claim 1, wherein the CB microphone control is only electrically coupled to the transceiver.

6. The system of claim 1, further comprising an integrated connector for electrically coupling the CB microphone control directly to the transceiver.

7. The system of claim 1, further comprising a relay disposed in electrical communication between the vehicle control unit and the transceiver.

8. A work machine, comprising:
   a chassis;
   a plurality of ground-engaging mechanisms coupled to the chassis for propelling the machine along a direction of travel;
   a cab mounted to the chassis;
   an implement coupled to the chassis and being operably controllable to perform a work function;
   a plurality of operator controls located in the cab for controlling the machine, the plurality of operator controls including at least a first movable control device for controlling a steering function of the machine and a second movable control device for controlling the implement; and
   a CB communication system located in the cab, the CB communication system including at least a transceiver and a CB microphone control push button, the transceiver adapted to receive and transmit audio signals;
   wherein, the CB microphone control push button is located on either the first movable control device or the second movable control device, and moves with movement of the first movable control device or the second movable control device;
   further wherein, the CB microphone control push button is controllable between an active position and an inactive position, where in the active position the transceiver is enabled to transmit an audio signal, and in the inactive position the transceiver is enabled to receive an audio signal.

9. The work machine of claim 8, wherein:
   the second control device comprises a joystick; and
   the CB microphone control push button is disposed in the active position when the push button is depressed.

10. The work machine of claim 8, further comprising a speaker system disposed in the cab for audibly transmitting a communication received by the transceiver.

11. The work machine of claim 10, further comprising a radio system for transmitting a signal via the speaker system, wherein the radio system is disabled from transmitting when the CB microphone control push button is in the active position.

12. The work machine of claim 11, wherein the radio system is disabled from transmitting when the CB microphone control push button is in the inactive position and the transceiver receives the communication.

13. The work machine of claim 8, further comprising an integrated connector for electrically coupling the CB microphone control push button directly to the transceiver.

14. The work machine of claim 8, further comprising a vehicle control unit electrically coupled between the CB microphone control push button and the transceiver.

15. The system of claim 14, wherein when the vehicle control unit detects the CB microphone control push button is in the active position, the vehicle control unit operably activates an output driver coupled to the transceiver to enable transmit functionality.

16. The system of claim 14, wherein the vehicle control unit is in electrical communication with the transceiver via a controller area network (CAN) link.

17. A method of transmitting an audio signal via a CB communication system from a work machine, comprising:
   providing a work machine having an operator's cab, a first control device and a second control device located in the cab, wherein each of the first control device and the second control device is a manipulable control device, and a vehicle control unit for controlling the machine;
   providing the CB communication system located in the cab, the CB communication system including at least a transceiver and a CB microphone control disposed on either the first manipulable control device or the second manipulable control device, the CB microphone control having an active position and an inactive position;
   steering the machine via input from the first movable control device by moving the first manipulable control device, wherein the CB microphone control moves with the first manipulable control device if disposed thereon;
   controlling the implement to perform a work function via input from the second manipulable control device by moving the second manipulable control device, wherein the CB microphone control moves with the second manipulable control device if disposed thereon;

detecting an actuation of the CB microphone control to its inactive position by the vehicle control unit; and transmitting a signal from the transceiver when the CB microphone control is disposed in its active position.

18. The method of claim 17, further comprising activating the CB microphone control on either the first manipulable control device or the second manipulable control device by an operator without any interruption of controlling the first or second manipulable control devices during movement of the first or second manipulable control device.

19. The method of claim 17, further comprising:

providing a radio system and a speaker system in the cab;

transmitting a signal from the radio system via the speaker system; and disabling the radio system when the CB microphone control is in the active position.

20. The method of claim 19, further comprising:

receiving a communication by the transceiver;

disabling the radio system when the transceiver receives the communication; and audibly communicating the communication received by the transceiver via the speaker system.

* * * * *